Dec. 24, 1935.   A. P. DANZ   2,025,575
CONTROL SYSTEM
Filed April 11, 1934
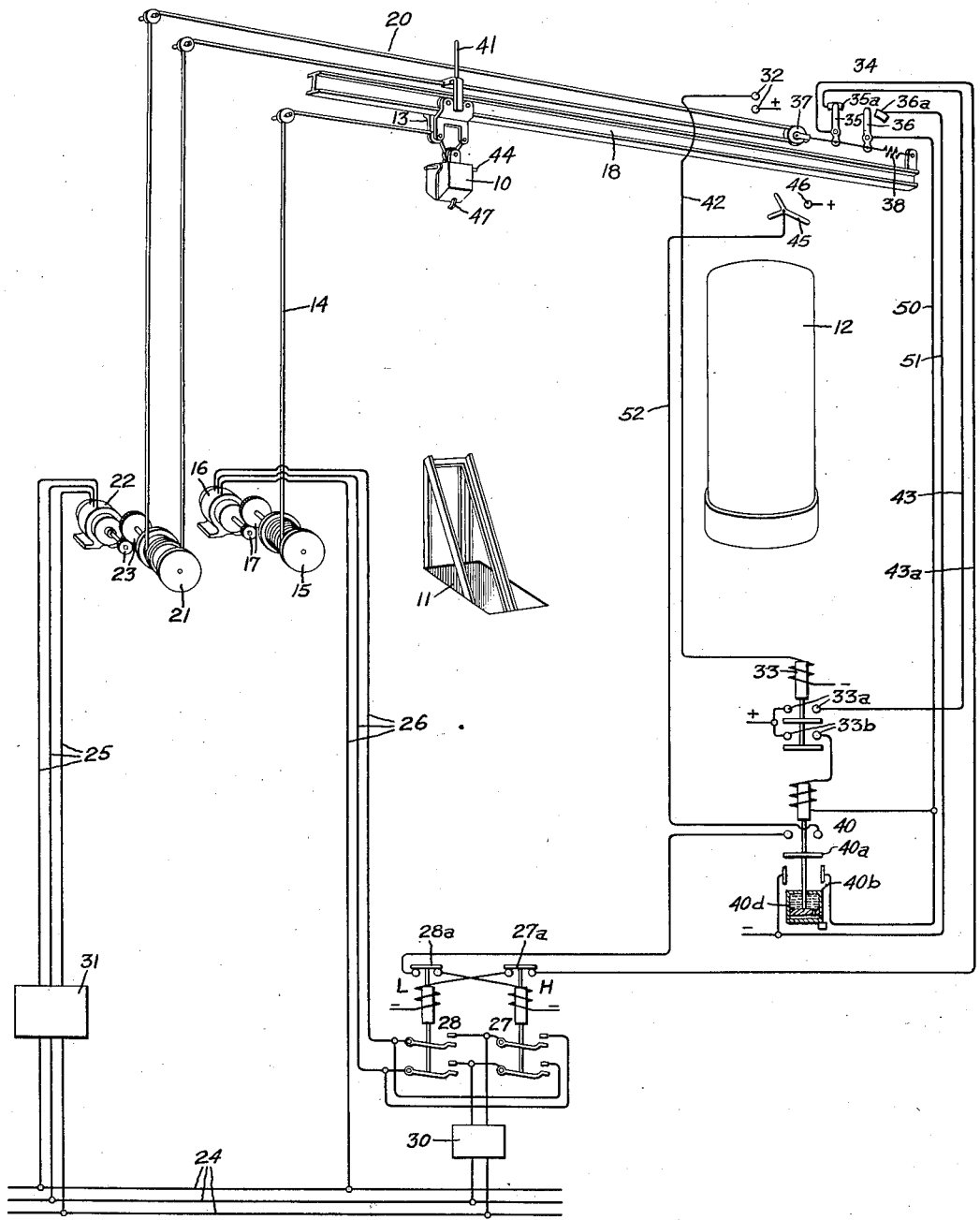
Inventor:
Arnold P. Danz,
by Harry E. Dunham
His Attorney.

Patented Dec. 24, 1935

2,025,575

UNITED STATES PATENT OFFICE 2,025,575

CONTROL SYSTEM

Arnold P. Danz, Larchmont, N. Y., assignor to General Electric Company, a corporation of New York Application April 11, 1934, Serial No. 720,067

8 Claims. (Cl. 214—116)

This invention relates to control systems, more particularly to systems for controlling the operation of electric motors and the like, and it has for an object the provision of a simple, reliable and improved system of this character.

More specifically the invention relates to material handling systems, and a more specific object of the invention is the provision of means for preventing the material carrier from returning with material from the unloading point to the loading point.

The invention is an improvement on the invention disclosed in application Serial No. 588,368—Freese, filed Jan. 23, 1932, and I do not herein claim anything disclosed in the said Freese application, which as far as the present application is concerned is to be regarded as prior art.

In carrying the invention into effect in one form thereof an electric motor is provided for moving a load to a predetermined limit of operation, e. g., an unloading point, and means are provided for removing the load and reversing the direction of rotation of the motor, together with means responsive to the continuance of a load on the motor after operation of the load removal means for again reversing the direction of the motor and causing it to move the load in the original direction.

In illustrating the invention in one form thereof, it is shown as embodied in a bucket-hoist, trolley-conveyor system.

For a better and more complete understanding of the invention, reference should now be had to the following specification and to the accompanying drawing, the single figure of which is a simple diagrammatical illustration of an embodiment of the invention.

Referring now to the drawing, a suitable material carrier illustrated as a bucket 10 serves to transport a material, such for example as coal, from a loading pit 11 to a silo 12. The bucket 10 is supported from a carriage 13 by means of a rope or cable 14, one end of which is connected to the carriage in the manner illustrated and the other end of which is connected to a hoisting drum 15. An electric motor 16, the driving shaft of which is connected to the shaft of the winding drum 15 by means of gearing 17, is provided for hoisting and lowering the bucket 10. Although the motor 16 may be of any suitable type, it is illustrated as an alternating current squirrel cage induction motor.

For the purpose of transporting the bucket 10 from a point immediately above the loading pit 11 to a point above the silo 12 an I-beam track 18 upon which the carriage 13 rides, is provided. The motion of the bucket 10 and the carriage 13 along this I-beam track is controlled by means of a trolley cable 20 which is wound upon the winding drum 21 which in turn is rotated by means of an electric motor 22 to the drive shaft of which the drum 21 is connected by means of suitable gearing 23.

The trolley motor 22 may be of any suitable type, but like the hoisting motor 16 is illustrated as an alternating current squirrel cage induction motor. Both motors 22 and 16 are supplied with power from a suitable source, represented in the drawing by the three supply lines 24, to which the motors 22 and 16 are respectively connected by means of conductors 25 and 26. Suitable reversing switch means, illustrated as a pair of contactors 27 and 28, are included in the connections 26 for controlling the direction of rotation of the hoist motor 16.

In order to control the hoisting and lowering operations of the bucket 10 at the loading pit 11, suitable control means 30 are provided. Since these control means are extremely complicated and form no parts of the present invention, they are illustrated conventionally for the purpose of simplifying the drawing.

Similarly, control means 31 are provided for controlling the trolley motion of the bucket 10 and carriage 13 between a point above the loading pit and a point above the silo 12. Since these control means are also quite complicated and likewise form no part of the present invention, they are illustrated conventionally in the drawing.

A switching device, illustrated as a limit switch 32 controls the operation of a control device illustrated as a relay 33 when the carriage 13 is located above the silo. This control relay 33 cooperates with a load responsive device 34 for controlling the energization of the hoisting and lowering contactors 27 and 28 when the carriage is located above the silo. The load responsive device 34 is illustrated as a switch which is so constructed and arranged that as long as the bucket 10 is loaded the movable contact 35 is maintained in engagement with its cooperating stationary contact member 35a and when the bucket 10 is unloaded the movable contact member 36 is maintained in engagement with its cooperating stationary contact member 36a. This is due to the fact that when the bucket 10 is loaded a tension exists in the hoisting cable 14 which is transmitted through the carriage to the trolley cable 20. Thus when the bucket is loaded, the tension in the trolley cable 20 between the carriage 13 and the pulley 37 is sufficient to maintain the movable contacts 35 in engagement with contacts 35a against the tension of spring 38 and similarly when the bucket is unloaded this tension decreases and allows the spring 38 to close the movable contact member 36 into engagement with the stationary contact member 36a.

Suitable means illustrated as a time delay relay 40 are provided which cooperate with switching device 34 for preventing an inertia load from energizing the lowering contactor and causing it to operate the motor 16 in a lowering direction when the bucket 10 is unloaded.

With the above understanding of the apparatus and its organization in the completed system, the operation of the system itself will be readily understood from the following detailed description.

It is assumed that the bucket 10 has been loaded in the pit 11, hoisted to the carriage 13 and moved along the I-beam track 18 to a position directly above the silo 12. The trolley motion of the bucket 10 is stopped at this point by the control means 31 under the control of suitable limit switch mechanism (not shown). As the bucket 10 is brought to rest at a position above the silo 12, the contact member 41 bridges the stationary contact members 32 to complete an energizing circuit for the operating coil of control relay 33, from the positive side of a supply source through the contacts 32, conductor 42, operating coil of the relay 33 to the negative side of the source. The relay 33 in responding to the energization of its operating coil bridges upper and lower stationary contact members 33a and 33b. The bridging of the stationary contact members 33a completes an energizing circuit for the operating coil of the lowering contactor 28, which circuit is traced from the positive side of a supply source through the stationary contact 33a, conductor 43, contacts 35 and 35a, conductor 43a, interlock 27a of the hoisting contactor, operating coil of lowering contactor 28 to the negative side of the supply source. As a result, the lowering contactor 28 is closed and connects the motor 16 to the supply source 24 for rotation in a direction such that the bucket 10 is lowered in the silo. As the bucket 10 descends, the pin 44 on the bucket engages the movable member 45 of a limit switch and knocks it over into engagement with its stationary contact member 46, partially to complete an energizing circuit for the operating coil of the hoisting contactor 27.

After the bucket passes the limit switch 45, it continues to descend into the silo until it strikes the top of the pile of material already in the silo. As it comes to rest against the material, the trip pin 47 is operated to unlock the jaws and simultaneously, the tension in the hoist cable disappears since the weight of the bucket and its load is now resting on the top of the pile of material within the silo. The disappearance of tension in the hoist cable 14 also causes the tension in the trolley cable between the carriage 13 and the pulley 37 to disappear, thus allowing the spring 38 to snap the movable contact member 35 out of engagement with its stationary contact member 35a and to snap the movable contact member 36 into engagement with its cooperating stationary contact member 36a.

The opening movement of the contact member 35 interrupts the energizing circuit of the lowering contactor 28 causing the latter to open its contacts and deenergize the hoisting motor 16. Similarly, the closing movement of the contact member 36 completes an energizing circuit for the operating coil of the time delay relay 40. This energizing circuit is traced from the positive side of a supply source through the contacts 33b (in the closed position thereof), operating coil of time delay relay device 40, conductor 50, contacts 36, and 36a, conductor 51 to the negative side of the supply source. In responding to the energization of its operating coil, the time delay device 40 moves its movable contact member 40a into engagement with the cooperating stationary contact to complete an energizing circuit for the operating coil of the hoisting contactor 27. This energizing circuit is traced from the positive side of the supply source through the contacts 45, 46 in the closed position thereof, conductor 52, contact 40a interlocking contacts 28a of the lowering contactor, operating coil of hoisting contactor 27 to the negative side of the supply source.

Contactor 27 in responding to the energization of its operating coil closes its contact to connect the motor 16 to the supply source 24 for rotation in a direction to hoist the bucket 10.

Simultaneously with the closing of the upper contact member 40a of the time delay device, the lower contact member 40b is operated into engagement with its cooperating stationary contacts to complete a holding circuit for the operating coil of the time delay device 40. After an interval of time, the duration of which is determined by the setting of the time delay device 40d, the movable contact 40b is pulled out of engagement with its cooperating stationary contacts thereby opening the holding circuit for the operating coil of the time delay device 40. The purpose of completing a holding circuit for the operating coil of the time element device is to prevent an inertia load, arising from accelerating the empty bucket in the upper direction, from operating the lowering contactor 28 and causing the motor 16 to lower the bucket 10. For example, in the absence of this time element device or if equivalent means were not provided, the inertia of the bucket 10 during acceleration in the hoisting direction would place sufficient tension on the trolley cable 20 to snap the contact member 36 out of engagement with its cooperating stationary contact member 36a and would snap the movable contact member 35 into engagement with its cooperating stationary contact member 35a. The opening of contacts 36 and 36a would of course deenergize the operating coil of the device 40 and its contacts would open to deenergize and open the hoisting contactor 27. However, since the time delay device 40d provides time delay action in the opening movement of the contact 40b, the holding circuit for the operating coil of the device 40 is maintained for an interval of time of sufficient duration to allow any transient inertia load to disappear. Thus, the contact 40a of the device 40 and the hoisting contactor 27 are maintained closed during an inertia load even though the force of the inertia load is sufficient to overpower the spring 38 and open the switch contact 36.

In the event that the bucket 10 has not been unloaded in the silo but starts back up with a full load, the tension on the trolley 20 will, of course, open the contact 36 and close the contact 35. This load will persist of course until after the contact 40b of the time element device has been opened by the spring 40c. The opening of the contact 40b deenergizes the operating coil of the device 40, allowing the contact 40a to deenergize and open the hoisting contactor 27. Contactor 27, in opening, of course deenergizes and stops the motor 16 thereby stopping the hoisting operations and also closes its interlock 27a to complete an energizing circuit for the operating coil of the lowering contactor 28. This circuit is the same as previously traced. The contactor 28 in closing energizes the motor 16 for operation in the lowering direction. It will also be observed that its interlock 28a interrupts the circuit of the hoisting contactor 27.

The bucket is again lowered until it rests against the top of the pile of material within the silo, and the described cycle of operation is repeated until sufficient material has been emptied out of the bucket to allow the switch contact 36 to remain closed during the hoisting motion.

Assuming now that the bucket has been dumped and is being hoisted, it rises until the pin 44 engages the movable contact member 45, snapping it out of engagement with the stationary contact 46, and opening the energizing circuit of the hoisting contactor 27. From this point on the horizontal trolley motion of the bucket 10 and the lowering of the bucket into the loading pit is under the control of controllers 30 and 31 respectively. As the carriage is moved to the left, the contacts 32 are opened to deenergize the relay 33 which in turn opens to deenergize the time delay relay 40 and further to interrupt the energizing circuit for the lowering contactor 28. Time element relay 40 in opening further interrupts the energizing circuit of the hoisting contactor 27.

Although in accordance with the provision of the patent statutes this invention is described as embodied in concrete form, it will be understood that the apparatus and connections shown in the drawing are merely illustrative and that the invention is not limited thereto since alterations and modifications will readily suggest themselves to persons skilled in the art without departing from the spirit of the invention or the scope of the annexed claims.

What I claim as new and desire to secure by Letters Patent of the United States, is:

1. A control system comprising an electric motor for controlling the movement of a load in one direction, means for removing said load at a limit of operation, means for reversing the operation of said motor at said limit, means responsive to continued load on said motor after operation of said load removing means for stopping said reverse operation of said motor, and a time element device for rendering said load responsive means inactive for an interval of time after removal of said load.

2. A control system comprising an electric motor for controlling the movement of a load in one direction, means for removing said load at a limit of operation, means for reversing the operation of said motor at said limit, means responsive to continuance of load on said motor after operation of said load removing means for again reversing said motor and causing it to move said load in said first mentioned direction and means for preventing the reversal of said motor due to inertia loads.

3. A control system comprising an electric motor for controlling the movement of a load in one direction, means for removing said load at a limit of operation, means for reversing the operation of said motor at said limit, means responsive to continuance of load on said motor after operation of said load removing means for again reversing said motor and causing it to return said load in said first mentioned direction, and means for preventing the return operation of said motor for a predetermined interval of time after the reversal of said motor at said limit.

4. A control system for electrically operated buckets and the like, comprising a motor for lowering the load to a limit of movement, means for removing said load at said limit, means for reversing the operation of said motor, a switching device responsive to continuance of said load after reversal of said motor for stopping said motor, and a time element device cooperating with said switching device for preventing stopping of said motor by said switching device for a predetermined interval of time after initiation of said reversal operation.

5. A control system for electrically operated buckets and the like comprising an electric motor for operating the bucket, means for causing said motor to lower the bucket to a limit of operation, means for dumping the bucket at said limit, a switching device for causing said motor to hoist the bucket and responsive to continuance of load in said bucket during said raising operation for stopping said motor and causing said motor to reverse and lower the bucket to said limit, and a time element device actuated by said switching device and cooperating therewith for preventing said switching device from stopping and reversing said motor for a predetermined interval of time after said initiation of said hoist.

6. A control system for electrically operated buckets and the like comprising an electric motor for operating the bucket, means for causing said motor to lower the bucket to a limit of operation, means for dumping the bucket at said limit, means for reversing said motor to raise the bucket, means responsive to continuance of the load in the bucket during the raising operation for reversing said motor to lower the bucket to said limit, and means for preventing the reversal of said motor by an inertia load.

7. A control system for trolley buckets and the like comprising an electric motor, a cable connecting said motor with the bucket, reversing switching means for controlling the direction of rotation of said motor comprising a hoisting contactor and a lowering contactor, means for removing the load from said motor at a limit of the lowering operation, a switching device controlled by the tension of said cable and responsive to the removal of said load for actuating said hoisting contactor and responsive to the continuance of said load on said motor for actuating said hoisting contactor to deenergize said motor and actuating said lowering contactor to reverse said motor, and a time element device set in operation by said switching device for rendering said device inactive to stop and reverse said motor for a predetermined interval of time after initiation of said hoisting operation.

8. A control system comprising an electric motor for controlling movement of a load in one direction, reversing switching means for controlling the direction of rotation of said motor, means for removing the load from said motor at a limit of operation, a switching device connected to be responsive to the removal of said load for actuating said switching means to reverse said motor and responsive to the continuance of load on said motor for again actuating said switching means to reverse said motor and causing it to move said load in said first mentioned direction, and a time delay device set in operation by the removal of said load for preventing said second reversal of said motor for a predetermined interval of time, thereby to prevent reversal of said motor due to an inertia load.

ARNOLD P. DANZ.